US008919289B2

(12) United States Patent
O'Connor

(10) Patent No.: US 8,919,289 B2
(45) Date of Patent: Dec. 30, 2014

(54) POULTRY REARING PROCESS

(75) Inventor: John O'Connor, County Limerick (IE)

(73) Assignee: Biomass Heating Solutions Limited, Killeedy, Ballagh, County Limerick (IE)

(*) Notice: Subject to any disclaimer, the term of this patent is extended or adjusted under 35 U.S.C. 154(b) by 290 days.

(21) Appl. No.: 13/130,393

(22) PCT Filed: Oct. 2, 2009

(86) PCT No.: PCT/EP2009/062863
§ 371 (c)(1),
(2), (4) Date: Sep. 8, 2011

(87) PCT Pub. No.: WO2010/057715
PCT Pub. Date: May 27, 2010

(65) Prior Publication Data
US 2012/0006279 A1   Jan. 12, 2012

(30) Foreign Application Priority Data
Nov. 20, 2008 (IE) ................................ 2008/0927

(51) Int. Cl.
A01G 1/04 (2006.01)
F23J 3/02 (2006.01)
F23C 10/24 (2006.01)
F23G 5/30 (2006.01)

(52) U.S. Cl.
CPC ............... *F23J 3/023* (2013.01); *F23C 10/24* (2013.01); *Y02E 20/12* (2013.01); *A01G 1/04* (2013.01); *F23G 5/30* (2013.01)
USPC ........................................... 119/442

(58) Field of Classification Search
USPC .......... 119/442, 437, 448; 110/110, 262, 346
See application file for complete search history.

(56) References Cited

U.S. PATENT DOCUMENTS 2,003,868 A * 6/1935 Shodron ................. 119/449
4,461,606 A   7/1984 Cormack
(Continued)

FOREIGN PATENT DOCUMENTS

DE    975727 C    6/1962
DE    2744684 A1    4/1979
(Continued)

OTHER PUBLICATIONS

International Search Report, mailed Jun. 4, 2010, in counterpart International Patent Application PCT/EP2009/062863, 8 pgs.
(Continued)

Primary Examiner — Monica Williams
(74) Attorney, Agent, or Firm — Ohlandt, Greeley, Ruggiero & Perle, L.L.P.

(57) ABSTRACT

This invention relates to a process of rearing poultry. The process comprises the steps of housing the poultry in a heated poultry shed, collecting poultry litter from the poultry shed, thermally treating the poultry litter and harnessing heat generated by the thermally treated poultry litter, and heating the poultry shed using the harnessed heat. In this way, the poultry litter may be used to heat the poultry in the shed and other expensive fuels will not have to be purchased to carry out this task, thereby reducing the operating cost of the poultry rearing process. Furthermore, the poultry litter will be available in an abundant supply. Due to the fact that the fuel is so readily available, it is possible to preheat the sheds to the ideal temperature prior to receiving the poultry and ventilate the poultry sheds both of which will result in the poultry thriving.

16 Claims, 4 Drawing Sheets

(56) References Cited

U.S. PATENT DOCUMENTS

| | | | |
|---|---|---|---|
| 4,462,341 | A | 7/1984 | Strohmeyer, Jr. |
| 5,305,713 | A | 4/1994 | Vadakin |
| 5,425,331 | A | 6/1995 | Abdulally |
| 5,563,803 | A | 10/1996 | Morihara et al. |
| 5,620,488 | A | 4/1997 | Hirayama et al. |
| 5,743,197 | A | 4/1998 | Kinni et al. |
| 2006/0104872 | A1 | 5/2006 | Ishikawa et al. |
| 2006/0236906 | A1 | 10/2006 | Buhr et al. |
| 2007/0012045 | A1 | 1/2007 | Chandran et al. |

FOREIGN PATENT DOCUMENTS

| | | | |
|---|---|---|---|
| DE | 4008287 | A1 | 9/1991 |
| DE | 102006004222 | A1 | 8/2007 |
| EP | 0063173 | A1 | 10/1982 |
| EP | 0202215 | A2 | 11/1986 |
| EP | 0305857 | A2 | 3/1989 |
| EP | 0509684 | A2 | 10/1992 |
| EP | 1182248 | A1 | 2/2002 |
| EP | 1245143 | A1 | 10/2002 |
| GB | 2073771 | A | 10/1981 |
| GB | 2148734 | A | 6/1985 |
| JP | 61183194 | A | 8/1986 |
| WO | 9810037 | A1 | 3/1998 |

OTHER PUBLICATIONS

International Preliminary Report on Patentability, mailed Jun. 3, 2011, in counterpart International Patent Application PCT/EP2009/062863, 7 pgs.

English translation of abstract of (German language) EP 0063173, 1 page.

English translation of abstract of (German language) EP 0305857, 1 page.

English translation of abstract of (German language) EP 1245143, 1 page.

English translation of abstract of DE 102006004222, 1 page.

English translation of abstract of DE 4008287, 1 page.

* cited by examiner

POULTRY REARING PROCESS

RELATED APPLICATIONS

The subject application is a U.S. National Stage application of International Application No. PCT/EP2009/062863, filed on 2 Oct. 2009, which claims the priority of Irish Patent Application No.: 2008/0927, filed on 20 Nov. 2008, the contents of which are herein incorporated by reference in its entirety.

INTRODUCTION

This invention relates to a poultry rearing process. More specifically, this invention relates to a process for rearing poultry in large quantities.

One common method of rearing poultry is to house large quantities of poultry chicks, otherwise referred to as broilers, in heated sheds. The broilers are provided with adequate heat, food and water over their growing cycle to promote the best possible growth of the broilers. Typically, day old broilers are delivered from a hatchery to the heated shed and are reared over a five to six week growing cycle depending on the type of broiler and the size of broiler required. Once the growing cycle is complete, the broilers are transported from the poultry shed to a poultry processing plant.

Although this method is quite efficient and economical compared to other known methods of rearing poultry, there are several problems with this method. First of all, heretofore, the known methods typically heat the shed using a liquefied petroleum gas (LPG), usually propane, heater. These heaters are expensive to run due mainly to the high cost of fuel. Secondly, these heaters deplete the oxygen levels in the shed and generate significant quantities of both carbon dioxide and water in the shed. Thirdly, due to the relatively high cost of heating the sheds, it is common to provide little ventilation in the shed due to the fact that there is a cost barrier in providing ventilation to the shed in the early stages of development when intensive heat is required. This lack of ventilation, when combined with the increased levels of carbon dioxide and water and the reduced level of oxygen in the shed, results in a humid environment with high levels of ammonia that is not ideal for broiler growth.

Sheds that are not properly ventilated and are not operating at the ideal bird growing conditions will lead to respiratory disease, breast lesions, foot pad lesions, leg hocks, blisters and other diseases. These diseases must be treated and they create an additional expense to the poultry farmer. Furthermore, the challenging environment has an impact on the bird performance and may affect the Food Conversion Ratio (FCR) which is the ratio of the amount of food (in Kg) eaten by a bird that is converted into meat (in Kg) on the bird. It is desirable to lower the FCR as much as possible and at present an FCR in or around 1.65 is considered to be an achievable target. A poor environment in the poultry shed can contribute to higher FCR which will give a lower return to the farmer.

Other methods of rearing poultry use diesel burners to heat the sheds however these methods suffer from many of the problems outlined above in relation to the LPG heaters. It has been known to use woodchip burners to heat the sheds however these require a constant supply of woodchip which must be purchased and transferred to the site of the poultry rearing process.

In addition to the above problems, there is a further problem with the known methods of rearing poultry in that the poultry create a significant amount of poultry litter which must be disposed of. Previously, most of the poultry litter was spread on land as a fertilizer however tighter regulation of the disposal of the poultry litter has made this practice less straightforward and more expensive to do. This is further eroding an already tight profit margin on each bird reared.

It is an object of the present invention to provide a poultry rearing process that overcomes at least some of the problems with the known types of processes.

STATEMENTS OF INVENTION

According to the invention there is provided a poultry rearing process comprising the steps of:
  housing the poultry in a heated poultry shed;
  collecting poultry litter from the poultry shed;
  thermally treating the poultry litter and harnessing heat generated by the thermally treated poultry litter; and
  heating the poultry shed using the harnessed heat.

By having such a process, the poultry litter may be used as a fuel to heat the poultry shed and it will no longer be necessary to spread the poultry litter as fertilizer. This will significantly reduce the cost of disposing of the poultry litter and circumvent the regulatory difficulties of disposing of the litter. Furthermore, the cost of fuel for heating the shed will be significantly reduced which will also improve the profit margin on each bird produced. As the process does not use LPG heaters or any other fossil fuel as the main source of heating for the shed, the environment in the shed will be less humid than previous implementations thereby providing improved growing conditions for the broilers. This provides the producer with the best conditions at the lowest cost to enhance bird performance.

In one embodiment of the invention there is provided a process in which the step of thermally treating the poultry litter comprises thermally treating the poultry litter in a fluidised bed unit. The fluidised bed unit is seen as a particularly useful unit to use as it is scalable and will be able to handle poultry litter with differing levels of moisture content. Furthermore, the fluidised bed unit will not require drying or pre-processing of the poultry lifter.

In one embodiment of the invention there is provided a process in which the poultry litter is combusted at a temperature of the order of 850° C. for at least two seconds. This is seen as advantageous as the pathogens in the poultry litter will be adequately treated. Secondly, the temperature is such that the minerals in the poultry litter will not become molten and be prone to fusing. Finally, the amount of Nitrous Oxide and Sulphur Dioxide produced will be relatively low.

In one embodiment of the invention there is provided a process in which the step of harnessing the heat generated by the thermally treated poultry litter comprises passing exhaust gases from the thermally treated poultry litter through a heat exchanger.

In one embodiment of the invention there is provided a process in which the step of harnessing the heat generated by the thermally treated poultry litter comprises using the heat from the thermally treated poultry litter to heat a liquid.

In one embodiment of the invention there is provided a process in which the heated liquid is delivered to a radiator element. This is seen as a useful way of providing indirect heating to the poultry shed.

In one embodiment of the invention there is provided a process in which the heated liquid is delivered to the radiator element located inside the poultry shed.

In one embodiment of the invention there is provided a process in which air is drawn over the radiator element and heated air is distributed inside the poultry shed. This is seen as a useful way of providing indirect heating to the poultry shed.

In one embodiment of the invention there is provided a process in which the heated liquid is transferred to a buffer tank prior to delivery to the radiator element.

In one embodiment of the invention there is provided a process comprising the steps of monitoring the temperature of the heated liquid in the buffer tank and maintaining the temperature of the heated liquid in the buffer tank at a desired temperature. This is seen as a simple way of ensuring that the fluidised bed unit may operate in a relatively uniform manner. Due to the fact that the water is being delivered to the buffer tank, the fluidised bed unit will operate to maintain the temperature of the water in the buffer tank at an appropriate level rather than trying to maintain the temperature of water throughout an entire heating system at an appropriate level. This is particularly useful if there is more than one poultry shed being serviced by the fluidised bed unit.

In one embodiment of the invention there is provided a process comprising the step of monitoring the temperature in the poultry shed and controlling the temperature of the environment in the poultry shed by regulating the flow of heated liquid to the radiator element.

In one embodiment of the invention there is provided a process in which the heated liquid is heated to a temperature of the order of 85° C.

In one embodiment of the invention there is provided a process in which the poultry shed is pre-heated prior to the poultry being housed in the poultry shed. Due to the inexpensive fuel being used, it is possible to pre-heat the poultry shed thereby obviating the risk of the broilers suffering from thermal shock.

In one embodiment of the invention there is provided a process in which the poultry shed is pre-heated up to a temperature above 30° C.

In one embodiment of the invention there is provided a process in which the poultry shed is preheated up to a temperature above 33° C.

In one embodiment of the invention there is provided a process in which the poultry shed is pre-heated for a period of between 1 and 5 days prior to the poultry being housed in the poultry shed.

In one embodiment of the invention there is provided a process in which the poultry shed is pre-heated for a period of 3 days prior to the poultry being housed in the poultry shed. This will ensure that the poultry shed is at the correct temperature and will maintain that temperature.

In one embodiment of the invention there is provided a process in which the poultry litter from a previous batch of poultry is thermally treated to provide heat for the current batch of poultry in the poultry shed.

In one embodiment of the invention there is provided a process in which on the poultry being reared, the poultry are removed from the poultry shed and the poultry litter in the poultry shed is collected and delivered to a fuel storage area for subsequent thermal treatment to heat the poultry shed.

In one embodiment of the invention there is provided a process comprising the step of ventilating the poultry shed. By ventilating, what is meant is that there will be a regular flow of air through the poultry shed, rather than an intermittent flow of air. Air will be allowed to pass through the shed to ensure that there is clean air in the shed. With the intensity of the business there is a need to remove the foul air continuously, except in the very early stages of development when the chicks are very young.

In one embodiment of the invention there is provided a process comprising the step of generating electricity with the harnessed heat generated by the burning poultry litter.

In one embodiment of the invention there is provided a process comprising the additional step of collecting the ash from the burning poultry litter. The ash is high in phosphate, approximately 18% of the ash is phosphate, and therefore this is a rich supply of concentrated phosphate.

DETAILED DESCRIPTION OF THE INVENTION

The invention will now be more clearly understood from the following description of some embodiments thereof given by way of example only with reference to the accompanying drawings, in which: —

Figure 1:
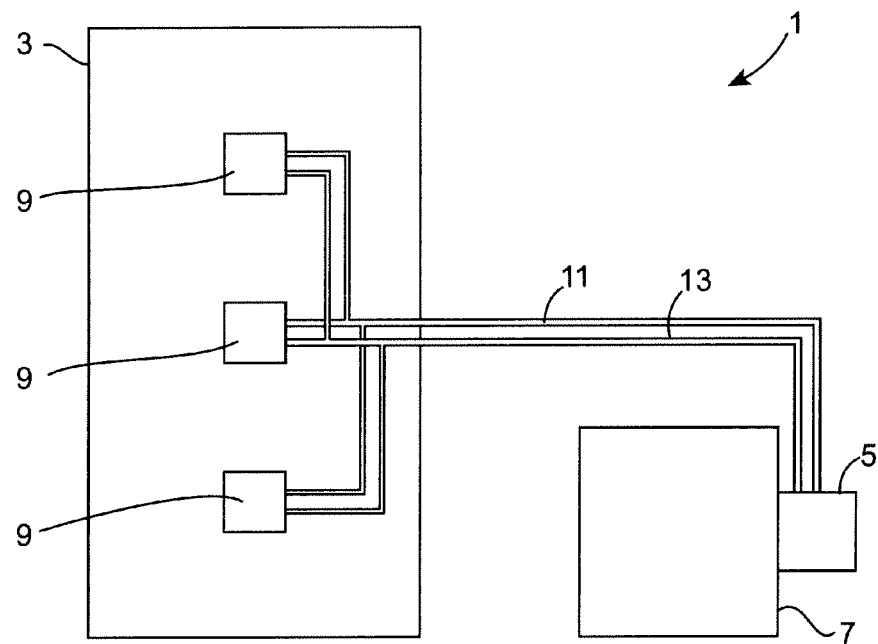
FIG. 1 is a site layout in which the process according to the present invention can be implemented.

Referring to FIG. 1, there is shown a site layout, indicated generally by the reference numeral 1, in which the process according to the invention can be implemented. The site 1 comprises a poultry shed 3, an energy conversion system 5 and a fuel storage area 7. The poultry shed comprises three indirect heaters 9, each of which comprises a radiator element (not shown) and a fan (not shown). The three indirect heaters are each provided with a flow line 11 and a return line 13.

In use, the energy conversion system 5 thermally treats poultry litter that has been collected from the poultry shed and uses the heat generated from the thermally treated poultry litter to heat water in a heat exchanger. This heated water is delivered through the flow pipes 11 to each of the radiator elements in the poultry shed 3. The fans are operated to draw air over the radiator elements to heat the air and distribute the heated air inside the poultry shed. The heated water flows through the radiator and returns to the heat exchanger through the return lines 13.

Figure 2:
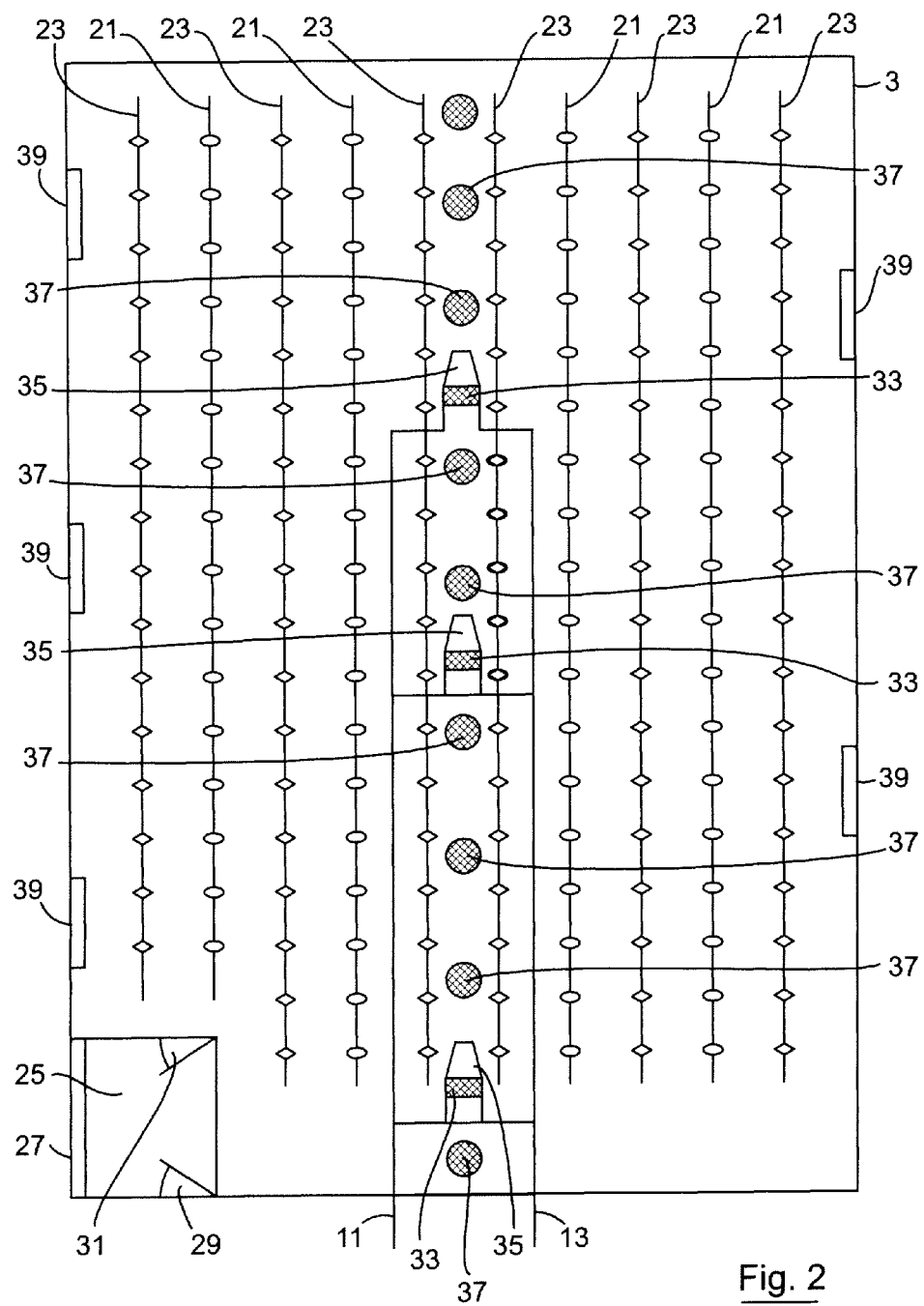
FIG. 2 is a plan view of the interior of a poultry shed in which the process according to the invention is implemented.

Referring to FIG. 2, there is shown a plan view of the interior of a poultry shed 3 in which the process according to the invention is implemented. The poultry shed comprises four feed lines 21 and six drinking lines 23. There are provided a plurality of feeding stations distributed along the feed lines, some of which are represented diagrammatically by an ellipsoid shape and there are provided a plurality of drinking stations distributed along the length of the drinking lines 23, some of which are represented diagrammatically by a diamond shape. In practice, there will be far more feeding stations along the feed line than the number shown, of the order of one hundred and four feeding stations on each line, and far more drinking stations along the drinking line than the number shown, of the order of three hundred drinking stations on each line. The number of feed lines, feeding stations, drink lines and drinking stations will of course depend on the size of the shed and the number of broilers kept in the shed. The feed lines, feeding stations, drink lines and the drinking stations are of standard construction and further explanation is not deemed necessary for the understanding of the present invention.

The poultry shed 3 comprises a control room 25 having control equipment 27 therein to allow the temperature of the room to be set and to allow monitoring of the conditions in the shed 3. There is provided an access door 29 from the exterior of the shed into the control room and an access door 31 from the control room 25 into the interior of the shed 3. Three indirect heaters 9 are provided in the shed. Each of the indirect heaters comprises a radiator element 33 and a fan element 35. The radiator elements are each connected to a flow line 11 and a return line 13. A plurality of air vents 37, in this case nine air vents, are located in the roof of the shed and form an air passageway between the interior of the poultry shed and the exterior of the poultry shed. The roof of the shed has been removed from the drawing for clarity. A plurality of side wall air vents 39, only a few of which are shown, are mounted in the walls of the poultry shed 3. The air vents 37 and 39 may be opened and closed as desired.

Figures 3, 4:
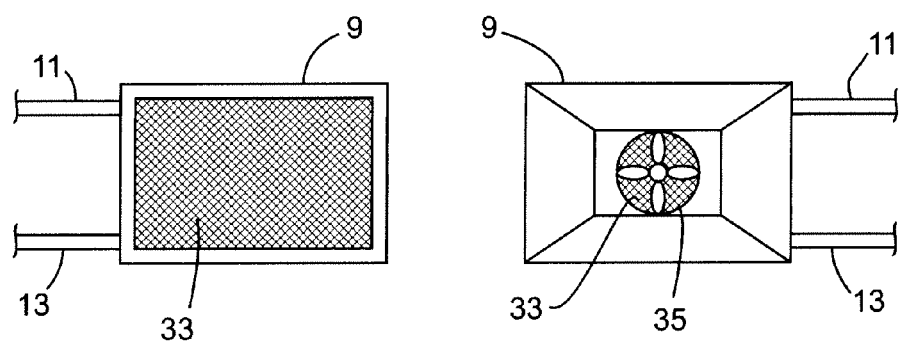
FIG. 3 is a rear view of a heater used in the process.
FIG. 4 is a front view of the heater of FIG. 3.

Referring to FIGS. 3 and 4, there is shown a pair of views of the indirect heater 9. The indirect heater 9 comprises a flow line 11 and a return line 13 which are connected to a radiator element 33 at one end and connected to a heated liquid source (not shown) at their other end. The indirect heater 9 comprises a fan 35 mounted on the front of the radiator element to draw air in through and over the radiator element 33 and then distribute that heated air into the inside of the shed.

Figure 5:
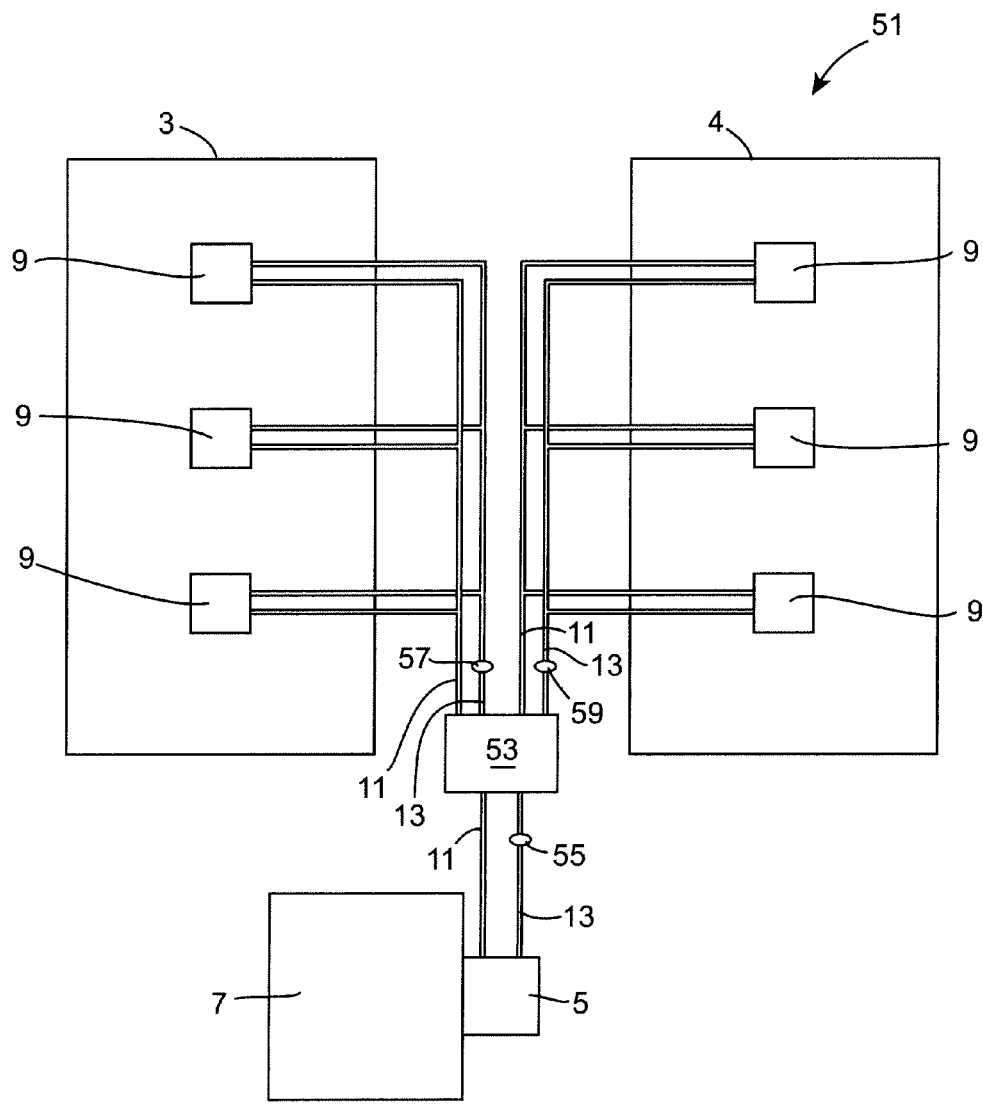
FIG. 5 is an alternative site layout in which the process according to the invention is implemented.

Referring to FIG. 5, there is shown an alternative construction of site layout, indicated generally by the reference numeral 51, in which the process according to the invention can be implemented. The site 51 comprises a pair of poultry sheds 3, 4 an energy conversion system 5 and a fuel storage area 7. Each of the poultry sheds 3, 4 comprises three indirect heaters 9, each of which in turn comprises a radiator element (not shown) and a fan (not shown). The three indirect heaters are each provided with a flow line 11 and a return line 13. The site 51 comprises a buffer tank 53 located intermediate the energy conversion system 5 and the heated sheds 3, 4. A pump 55 is provided to pump water from the buffer tank 53 back to the energy conversion system 5. A pump 57 is provided to pump water back from the indirect heaters 9 in the first poultry shed 3 and a pump 59 is provided to pump water back from the indirect heaters 9 in the second poultry shed 3, 4.

The energy conversion system operates to keep the liquid, in this case water, in the buffer tank at a uniform temperature, preferably 85° C. The energy conversion system thermally treats poultry litter and harnesses the heat from the burning of the poultry litter to heat water which is passed to the buffer tank. The hot water in the buffer tank 53 is then delivered to the radiator elements of the indirect heaters 9 in the sheds 3, 4 and returned to the buffer tank 53 where it may then be returned to the energy conversion system for re-heating. Various hydronic manifolds may be provided to ensure that the flow and the return water is kept as separate as possible to prevent thermal siphoning of the heat in the water and to ensure that the hottest water is delivered to the indirect heaters 9 and the coldest water is returned to the energy conversion system 5.

Figure 6:
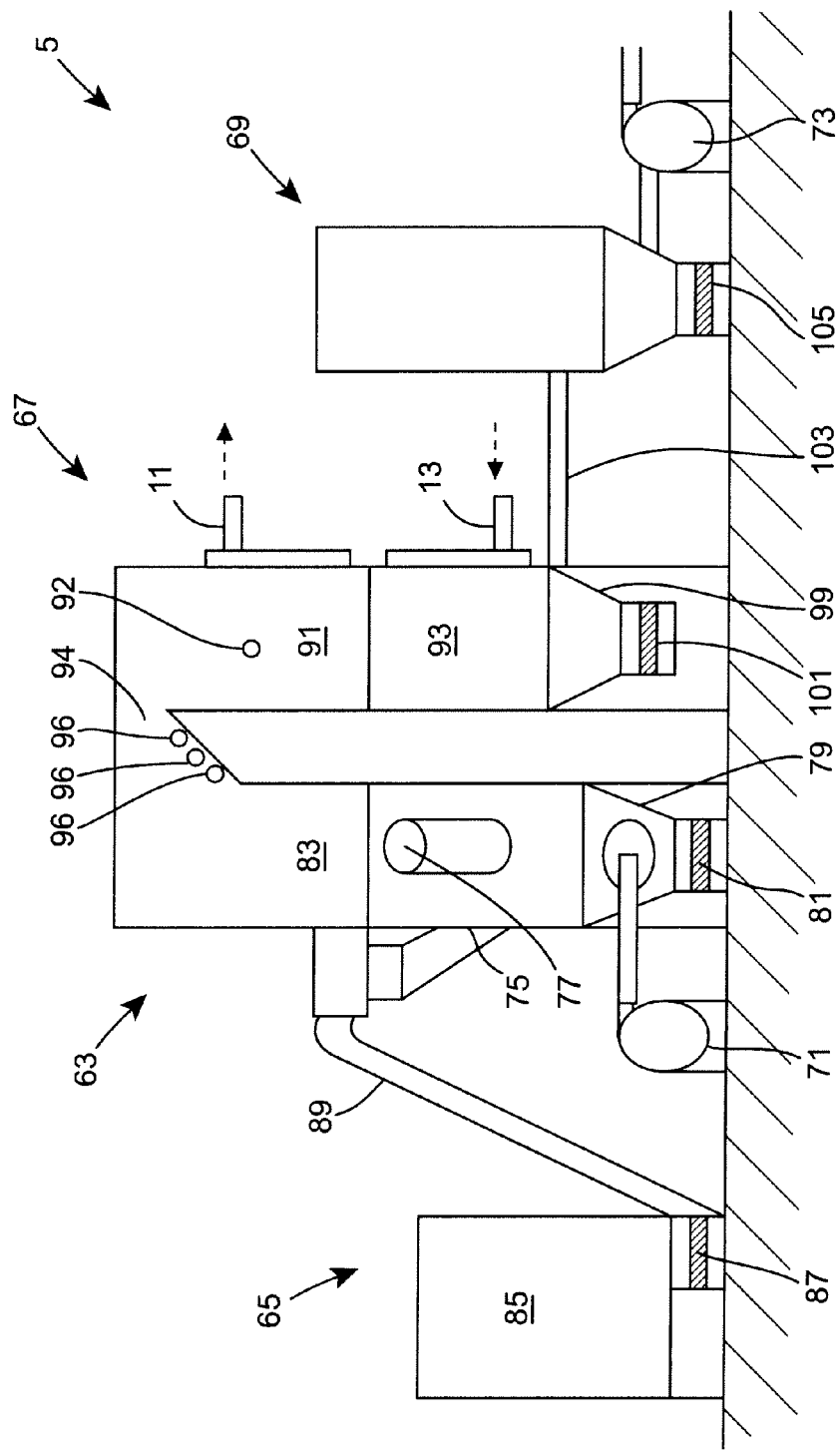
FIG. 6 is a side view of an energy conversion system used in the process.

Referring to FIG. 6, there is shown an energy conversion system, indicated generally by the reference numeral 5, comprising a fluidised bed unit 63, a by-product fuel feed system 65 feeding the fluidised bed unit 63, a heat exchanger 67 operatively coupled to the fluidised bed unit 63, an exhaust filter 69 operatively coupled to the heat exchanger 67 and a negative pressure system. The negative pressure system comprises a forced draught fan 71 and an induction draught fan 73 which are operable to maintain a flow of exhaust gases in the direction from the fluidised bed unit 63 through the heat exchanger 67.

The fluidised bed unit 63 further comprises a charging inlet 75 for fuel delivered by the by-product fuel feed system 65, a diesel burner (not shown) connected to a burner inlet 77 and a furnace sump 79 containing fluidised bed media. The furnace sump 79 tapers inwardly towards the bottom of the furnace sump where there is a clinker and ash extraction unit, in this case a furnace ash removal auger 81 located at the bottom of the furnace sump 79. The fluidised bed unit further comprises an air introducer assembly most of which is mounted substantially in the furnace sump for delivering air up through the fluidised bed media in the sump. The air introducer further comprises the forced draught fan 71 from the negative pressure system. Above the furnace sump 79 is the furnace freeboard 83.

The by-product fuel feed system 65 comprises a hopper 85, a variable speed auger 87 and a fuel conveyor 89 to deliver fuel from the hopper to the charging inlet 75 of the fluidised bed unit. The variable speed auger 87 is operated to deliver a desired amount of fuel from the hopper 85 onto the fuel conveyor 89.

The heat exchanger 67 comprises a pair of heat exchanger units, an upper heat exchanger unit 91 and a lower heat exchanger unit 93. The lower heat exchanger unit 93 is provided with a cold water return pipe 13 and the upper heat exchanger unit 91 is provided with a hot water flow pipe 11. The lower heat exchanger unit 93 and the upper heat exchanger unit 91 are in liquid communication with each other so that liquid that travels into the lower heat exchanger unit 93 travels upwards through the lower heat exchanger, into the upper heat exchanger, upwards through the upper heat exchanger 91 and out of the hot water flow pipe in the upper heat exchanger unit 91.

The upper heat exchanger unit 91 further comprises a heat exchanger soot blower 92 mounted across the heat exchanger and extending between a plurality of tubes (not shown) of the upper heat exchanger unit. The heat exchanger soot blower 92 is rotatably mounted in the upper heat exchanger unit 91. Below the lower heat exchanger unit 93 is a heat exchanger sump 99 which is provided with a heat exchanger ash removal auger 101 to remove ash from the heat exchanger sump. The heat exchanger 67 is operatively coupled to the fluidised bed unit by way of a freeboard interconnector 94. The freeboard interconnector 94 is provided with a plurality of pulsed blower nozzles 96 arranged substantially in line with the floor of the freeboard interconnector 94. Pressurised air is periodically passed through the pulsed blower nozzles 96 to dislodge any settled ash from the floor of the freeboard interconnector 94. A heat exchanger exhaust conduit 103 operatively couples the heat exchanger 67 to the exhaust filter 69.

The exhaust filter 69 is a bag filter having a plurality of bags to catch the fly ash from the exhaust gases. The exhaust filter 69 comprises an ash extractor auger 105 located at the bottom of the exhaust filter 69. The induction draught fan 73 is coupled to the exhaust filter 69 and draws exhaust gases through the energy conversion system 5 from the fluidised bed unit 63, through the heat exchanger 67 and through the exhaust filter 69.

In use, poultry litter is delivered from the hopper 85 along the fuel conveyor 89 and is delivered into the fluidised bed unit 63 where it is thermally treated at a temperature of at least 850° C. for at least two seconds. The temperature of the fluidised bed is between 610° C. and 750° C., preferably approximately 670° C. Just above the fluidised bed, in the lower furnace freeboard, the temperature is approximately 850° C. and at the top of the upper furnace freeboard adjacent the freeboard interconnector 94, the temperature is in the region of between 1000° C. and 1200° C. The height of the furnace freeboard and the negative pressure is such that the fuel remains in the region at or above 850° C. for a minimum of 2 seconds and this ensures that all pathogens are killed.

A plurality of temperature sensors are arranged in the fluidised bed unit furnace. There are four temperature sensors in the fluidised bed itself, one temperature sensor in the lower furnace freeboard just above the fluidised bed and another temperature sensor in the upper furnace freeboard. These temperature sensors closely monitor the temperature of the fluidised bed unit and if the temperature should deviate from the desired values or ranges, corrective action may be taken. If the temperature of the fluidised bed lowers, the variable speed augers are operated to increase the amount of fuel that is delivered to the fluidised bed unit 63. If the fuel has relatively high moisture content, the fuel may not immediately cause the temperature to rise in the fluidised bed and other action must be taken. In such an instance, further fuel may be added or alternatively, the diesel burner is started and provides a boost to the fluidised bed.

The hot exhaust gases rise up through the furnace through the lower and upper furnace freeboards, through the interconnecting freeboard 64 and down through the heat exchanger 67. The heat exchanger 67 comprises a plurality of tubes (not shown) filled with water and the water in the tubes is heated by the hot exhaust gases passing over the tubes. The hot exhaust gases are then passed out of the heat exchanger to the exhaust filter 69 where fly ash is removed from the exhaust gases and the filtered exhaust gases are released into the atmosphere. The exhaust gases released into the atmosphere are still at approximately 150° C. to 200° C. An exhaust filter has an ash extractor auger 105 which removes ash out from the filter. The ash taken from the filter typically has a phosphate content of 18% by weight of the ash and 8% potassium by weight of the ash and may be sold on as a useful by-product for fertilizers and the like.

The heat exchanger 67 is coupled to a heating system of the poultry shed (not shown) either directly by the flow pipe 11 and the return pipe 13 or indirectly through a buffer tank (not shown). The heating system of the poultry shed comprises an indirect heater 9 which in turn comprises a radiator element 33 and a fan 35 for circulating hot air surrounding the fan. In order to couple the heat exchanger to the heating system, the hot water flow pipe 11 is connected to the radiator element (or buffer tank) and the cold water return pipe 13 is connected to a water source such as a water buffer tank or a direct return pipe 13 from the radiator bank. If a water buffer tank is used the water filling the water buffer tank will come from the radiator bank.

In use, one day old birds are delivered from a hatchery to the shed. The shed will have been pre-heated for of the order of 3 days prior to the arrival of the birds. By pre-heating the sheds, the birds will not experience a dramatic fall in environment temperature which is highly desirable. Due to the very low cost of the fuel, in this case the poultry litter from a previous batch of poultry that were housed in the shed, the poultry shed may be heated for a significant period of time prior to the arrival of the birds.

The shed is pre-heated to of the order of 35° C. although this will depend on the variety of poultry being delivered into the shed. The temperature may differ by 1° C. to 2° C. depending on the breed of poultry. Due to the fact that the fuel is readily available and inexpensive, it may be used to pre-heat the sheds up to the ideal growing temperature well in advance of the birds arrival and therefore fuel costs are no longer of significant concern for the operator of the poultry rearing process. For one variety of poultry, the shed is initially heated to 35° C. for the first week of the growing cycle. This is the most important week of growth for the poultry and if the conditions for the poultry are optimal for growth in the first week the tendency is for the poultry to thrive for that and the remainder of the growing cycle. The temperature is lowered to 30° C. for the second week of the growing cycle and the temperature is lowered further to 26° C. for the third week of the growing cycle. The temperature is lowered to 24° C. for the fourth week of the growing cycle, 22° C. for the fifth week of the growing cycle and 20° C. for the sixth week of the growing cycle, if appropriate. The above temperatures are suitable for the Ross 305 breed of broiler however other temperature ranges may be used to suit this and other different types of bird.

When the growing cycle has elapsed, the poultry are removed from the shed, the feed lines 21 and drinking lines 23 are raised off the floor in the shed and the poultry litter is collected from the shed and delivered to a fuel storage area 7. The poultry litter in the fuel storage area 7 is then burnt prior to the arrival and during the housing of the next or subsequent batch of poultry in the shed.

Due to the fact that the cost of fuel is significantly reduced, it is possible to provide more heat and ventilation in the poultry shed. This has numerous advantages for the welfare of the poultry as the fresh air circulating through the housing will provide a better quality atmosphere for the poultry. The oxygen levels will be increased and the carbon dioxide, carbon monoxide and ammonia levels in the poultry shed will be decreased. This will lead to healthier, happier poultry.

Ammonia in particular is a hazard to the welfare of the birds. There is a high concentration of Nitrogen in poultry litter (approximately 11 Kg per tonne of litter). If the litter is damp and fresh air does not circulate above the Nitrogen, the Nitrogen will combine with Hydrogen to form Ammonia. Ammonia causes respiratory disease in poultry and has a very strong odour which is repugnant. By providing more ventilation in the poultry shed, the air will circulate in the poultry shed and remove the excess Ammonia from the atmosphere and prevent more Ammonia forming.

Furthermore, by providing more heat and ventilation in the poultry shed, the bedding material and poultry litter on the floor of the shed will be drier than was heretofore the case which is also of great benefit to the poultry. The poultry will be less prone to contracting disease and forming lesions, blisters or hocks on dry bedding than they would if the bedding was damp. The drier bedding is also a result of dispensing with the need for propane or other LPGs. Propane ($C_3H_8$) in particular, when it burns in Oxygen ($O_2$), produces high levels of Carbon Dioxide ($CO_2$) and Water ($H_2O$) as can be seen from the equation below:

$$C_3H_8 + 5O_2 \rightarrow 3CO_2 + 4H_2O$$

If the ventilation in the shed is relatively poor, the water is trapped inside the shed and the conditions in the shed become very humid which is bad for the poultry and makes the bedding damp.

In the embodiments described, the heat from the thermal treatment of the poultry litter is harnessed and used to heat the poultry sheds. It is envisaged that the thermal treatment of the poultry litter could also be used to generate electricity by first of all creating steam. This electricity could be generated by providing a compressor to convert the hot water into steam, a turbine to be operated by the steam to use the steam to generate mechanical motion and an alternator coupled to the turbine to generate the electricity by converting the mechanical motion into electricity. Alternatively, an organic rankine cycle, a sterling engine or an externally fired gas turbine could be used to help generate the electricity. The electricity thus generated could be used to power the fans thereby making the system even more self sufficient or alternatively the electricity could be used elsewhere in the installation or exported onto the grid.

In the embodiments described above, the radiator element has been described as a radiator element that stores hot water.

It will be understood that in an alternative embodiment of the invention, the radiator element could store a heated gas or other liquid or alternatively could be an electrical radiator element, such as an electrical coil. Current could be passed through the electrical radiator element to heat up the radiator element and the heat from the electrical radiator element could be used to heat the poultry shed. A fan may be provided to draw air over the electrical radiator element and circulate the hot air in the shed. The electrical radiator element could be powered by electricity harnessed from the thermal treatment of the poultry litter.

Throughout the specification, reference is made to poultry litter. It will be understood that poultry litter is intended to mean the material left on the floor of the poultry shed after the growing cycle of the poultry has finished. Initially, the floor of the shed will have been covered in a wood chip, saw dust or similar type bedding material and the birds will defecate on top of this material. When the birds have reached the end of the growing cycle, the material left on the floor is typically of the order of one part saw dust (for example) and twenty five parts poultry litter. Therefore, as the vast majority of the material is poultry litter, reference is made only to thermally treating poultry litter however it will be understood that the poultry litter may contain small amounts of other materials.

The poultry litter typically has a moisture content of between 20% and 55% by weight of the poultry litter. The fluidised bed unit is ideal for poultry litter as it is able to handle poultry litter having different levels of moisture content without significantly impairing performance. Furthermore, the design of fluidized bed unit described is compact and may be implemented in relatively small installations as a standalone machine. It is envisaged that the fluidised bed unit will be sized to handle of the order of one to ten tonnes of poultry litter each day depending on the size of the installation and therefore will be sufficiently compact in construction to allow installation on a farm or poultry rearing plant.

In the above examples, the heated air may be circulated throughout the sheds using large fans that draw air over the radiator elements. This is a particularly advantageous construction as the fans may also be operated on hot days without hot water or electrical current being delivered to the radiator elements. When used in this manner, the fans are used to circulate air in the sheds and cool the sheds. It is envisaged that a cooling fluid could be provided in the radiator elements to further cool the sheds if need be and suitable equipment similar to that described above could be used to circulate cooling fluid in the radiator elements. All that would be required is a device to cool the fluid.

In addition to generating heat for heating the poultry shed, it will be possible to generate steam and or electricity as well as or instead of the heat if desired. Excess energy generated in the process will be used to generate electricity which can be used on the site or sold back to the grid.

By thermal treatment or thermally treating the by-product, what is meant is that the by-product is burnt or combusted in the fluidized bed. Reference has been made to the incineration of waste and/or by-products and the terms have been used largely interchangeably throughout the specification. For example, in some jurisdictions, poultry litter or mushroom compost is considered to be a by-product whereas in other jurisdictions it is considered to be a waste.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the specification.

The invention claimed is:

1. A poultry rearing process comprising the steps of:
   housing the poultry in a heated poultry shed;
   collecting poultry litter from the poultry shed;
   thermally treating the poultry litter and harnessing heat generated by the thermally treated poultry litter; and
   heating the poultry shed using the harnessed heat;
   characterized in that,
   the step of thermally treating the poultry litter comprises burning the poultry litter in a fluidized bed unit, and
   wherein the fluidized bed unit comprises a plurality of temperature sensors that are arranged in the fluidized bed unit to closely monitor a temperature of the fluidized bed in the fluidized bed unit, and
   wherein when the temperature sensors determine that the temperature of the fluidized bed has lowered below a desired value, the process further comprises the steps of:
   increasing the amount of fuel that is delivered to the fluidized bed unit, and,
   determining whether increasing the amount of fuel delivered to the fluidized bed unit has increased the temperature of the fluidized bed; and
   when it is determined that increasing the amount of fuel delivered to the fluidized bed unit has not increased the temperature of the fluidized bed, activating an ancillary burner to act on the fluidized bed.

2. A process as claimed in claim 1 in which the poultry litter is thermally treated at a temperature of the order of 850° C. for at least two seconds.

3. A process as claimed in claim 1 in which the step of harnessing the heat generated by the thermally treated poultry litter comprises passing exhaust gases from the thermally treated poultry litter through a heat exchanger.

4. A process as claimed in claim 1 in which the step of harnessing the heat generated by the thermally treated poultry litter comprises using the heat from the thermally treated poultry litter to heat a liquid; delivering the heated liquid to a radiator element located inside the poultry shed.

5. A process as claimed in claim 4 in which air is drawn over the radiator element and heated air is distributed inside the poultry shed.

6. A process as claimed in claim 4 in which the heated liquid is transferred to a buffer tank prior to delivery to the radiator element.

7. A process as claimed in claim 6 in which the process comprises the steps of monitoring the temperature of the heated liquid in the buffer tank and maintaining the temperature of the heated liquid in the buffer tank at a desired temperature.

8. A process as claimed in claim 4 comprising the step of monitoring the temperature in the poultry shed and controlling the temperature of the environment in the poultry shed by regulating the flow of heated liquid to the radiator element.

9. A process as claimed in claim 4 in which the heated liquid is heated to a temperature of the order of 85° C.

10. A process as claimed in claim 1 in which the poultry shed is pre-heated prior to the poultry being housed in the poultry shed.

11. A process as claimed claim 1 in which the poultry litter from a previous batch of poultry is thermally treated to provide heat for the current batch of poultry in the poultry shed.

12. A process as claimed in claim 1 in which on the poultry being reared, the poultry are removed from the poultry shed and the poultry litter in the poultry shed is collected and delivered to a fuel storage area for subsequent thermal treatment to heat the poultry shed.

13. A process as claimed in claim 1 comprising the step of generating electricity with the harnessed heat generated by the thermally treated poultry litter.

14. A process as claimed claim 1 comprising the additional step of collecting the ash from the thermally treated poultry litter.

15. A poultry rearing process comprising the steps of:
housing the poultry in a heated poultry shed;
collecting poultry litter from the poultry shed;
thermally treating the poultry litter and harnessing heat generated by the thermally treated poultry litter; and
heating the poultry shed using the harnessed heat,
wherein the step of thermally treating the poultry litter comprises burning the poultry litter in a fluidized bed unit at a temperature of the order of 850° C. for at least two seconds, and
wherein the fluidized bed unit comprises a plurality of temperature sensors that are arranged in the fluidized bed unit to closely monitor a temperature of the fluidized bed in the fluidized bed unit, and
wherein when the temperature sensors determine that the temperature of the fluidized bed has lowered below a desired value, the process further comprises the steps of:
increasing the amount of fuel that is delivered to the fluidized bed unit;
determining whether increasing the amount of fuel delivered to the fluidized bed unit has increased the temperature of the fluidized bed; and
when it is determined that increasing the amount of fuel delivered to the fluidized bed unit has not increased the temperature of the fluidized bed, activating an ancillary burner to act on the fluidized bed.

16. A process as claimed in claim 15 in which the step of harnessing the heat generated by the thermally treated poultry litter comprises passing exhaust gases from the thermally treated poultry litter through a heat exchanger.

* * * * *